United States Patent [19]

Rasmussen

[11] 4,015,822
[45] Apr. 5, 1977

[54] CAMPER JACK

[76] Inventor: Carl M. Rasmussen, 377 S. Sterling Drive, Fruit Heights, Utah 84037

[22] Filed: Dec. 8, 1975

[21] Appl. No.: 638,789

[52] U.S. Cl. .............................................. 254/45
[51] Int. Cl.² ........................................ B60P 1/64
[58] Field of Search ............. 254/45, 93 H, 86 H

[56] References Cited

UNITED STATES PATENTS

| | | | |
|---|---|---|---|
| 2,583,923 | 1/1952 | Anschvetz | 254/93 H |
| 3,549,027 | 12/1970 | Batson | 254/45 |
| 3,758,074 | 9/1973 | Jeffries et al. | 254/45 |
| 3,897,044 | 7/1975 | Tallman | 254/86 H |

Primary Examiner—Al Lawrence Smith
Assistant Examiner—Robert C. Watson
Attorney, Agent, or Firm—H. Ross Workman; J. Winslow Young

[57] ABSTRACT

A camper jack for mounting on a camper body, the jack having an extensible leg projectable from a hollow jack housing and attached to the camper body along the length of the housing. A piston cooperating in a cylinder in the extensible leg extends the leg from the housing. A hydraulic fluid reservoir is formed in the extensible leg in an annular space surrounding the cylinder. A valve block is coextensive with the extensible leg at the foot of the leg and contains the valves and pumping piston for the jack. Valving in the valve block permits manual extension and retraction of the extensible leg.

2 Claims, 4 Drawing Figures

CAMPER JACK

BACKGROUND

1. Field of the Invention

The present invention relates to jacks which are mountable on a camper body and are useful for loading, removal, and/or leveling of the camper body.

2. The Prior Art

Currently there is a plethora of camper jacks available on the market ranging from simple mechanical jacks to sophisticated hydraulic units and are either demountable or are permanently mounted on the camper body.

One prior art camper jack, in particular, is attachable to a camper body only along a relatively short distance of the mid-section of the jack. An enlarged hydraulic fluid reservoir precludes snug engagement of the camper jack to the camper body, and brackets must be used to bridge the resultant gap at the mid-section of the jack. Accordingly, the jack is attached to the camper body in a relatively insecure manner, particularly since attachment at the hydraulic fluid reservoir itself is not possible. The reservoir also occupies a segment of the jack body which would otherwise be occupied, to some extent, by the extensible leg of the jack resulting, therefore, in a shorter extensibility of the jack.

With the valving mechanism and hydraulic fluid pumping apparatus of the jack located on top of the reservoir, the working level of the pump is elevated and is continually changing during operation of the jack. The constantly changing elevation of the working level is inconvenient and subjects to jack attachment point to undue stresses when the camper body tends to wobble.

A further problem arises from the upper hydraulic fluid reservoir because leaks, when they occur, result in hydraulic fluid staining a substantial portion of the length of the jack and thus serving to collect dust and debris on the jack.

Generally, manual extension of prior art jacks is possible only to a limited extent. Lowering of the extensible leg of the jack to contact with the ground so as to support a camper is, therefore, possible only through operation of the pumping mechanism. This is both tedious and inconvenient, particularly if the extensible leg must be extended a considerable distance before it contacts the ground surface.

BRIEF SUMMARY AND OBJECTS OF THE INVENTION

The present invention is a camper jack for mounting upon movable bodies such as camper bodies for facile raising, lowering, and leveling of the movable bodies. The jack is securely attachable to a camper body. Snug securement is possible since the hydraulic fluid reservoir is an integral part of the extensible leg and is formed in the annular space surrounding the jack cylinder. An elongated piston cooperates in the cylinder and is attached to a housing which completely enclosed the extensible leg upon retraction. A valve block coextensive with the extensible leg and at the base thereof contains the hydraulic fluid valving and pumping mechanisms. Access to all of the hydraulic fluid valving and pumping apparatus is easily available from the external periphery of the valve block.

Facile manual extension and retraction are possible since the valving mechanism is located below the hydraulic fluid reservoir and the jack cylinder easily permitting transfer of hydraulic fluid from one to the other without operation of the pumping mechanism. Additionally, leaks, if they occur, stain only a small portion of the base of the jack and not the entire length thereof.

Not only does the housing serve to protect the jack apparatus during transit but also presents a uniform profile since the cross-sectional area of the jack is uniform along its entire length.

It is, therefore, a primary object of this invention to provide improvements in camper jacks.

It is another object of this invention to provide a camper jack wherein a substantial portion of the operating mechanism of the jack is retractable within a protective housing.

It is a further object of this invention to provide a camper jack wherein the operating level of the hydraulic pumping mechanism remains constant at ground level.

Another object of this invention is to provide a camper jack with an extensible leg that is manually extensible and retractable.

Another object of this invention is to provide a hydraulic jack with a hydraulic valve block wherein all hydraulic fluid control devices are readily accessible from the external periphery of the valve block.

These and other objects and features of the present invention will become more fully apparent from the following description and appended claims taken in conjunction with the accompanying drawing.

DETAILED DESCRIPTION OF THE PREFERRED EMBODIMENTS

The invention is best understood by reference to the Figures wherein like parts are designated with like numerals throughout.

Figure 1:
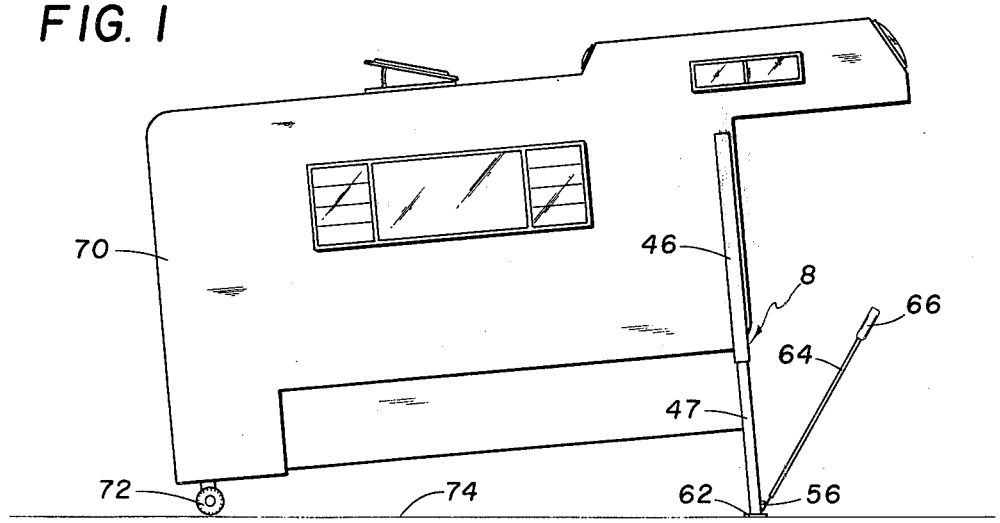
FIG. 1 is a side elevational view of a conventional camper body with the hydraulic jack embodiment of the present invention mounted upon the forward end of the camper and in a partially extended position.

Referring now to FIG. 1, a camper body 70 is schematically illustrated and is provided at its forward end with a jack assembly, generally designated 8. The jack assembly 8 includes an exterior housing 46 and a leg 47 extensible to contact the ground 74. The rear end of the camper may be supported in like manner by another jack assembly to facilitate loading of the camper. Alternatively, conventional support structure 72, usually incorporated in camper loaders could be used.

To adapt the camper jack assembly 8 to be usable upon a camper, the jack is attached to camper body 70 and is situated juxtaposed the camper body 70 substantially along the entire portion of the length of exterior housing 46 which overlaps the camper body exterior. Since the housing 46 does not have a diametrally enlarged fluid reservoir as in the prior art devices, it is possible to snugly engage housing 46 with the camper body 70.

Figure 2:
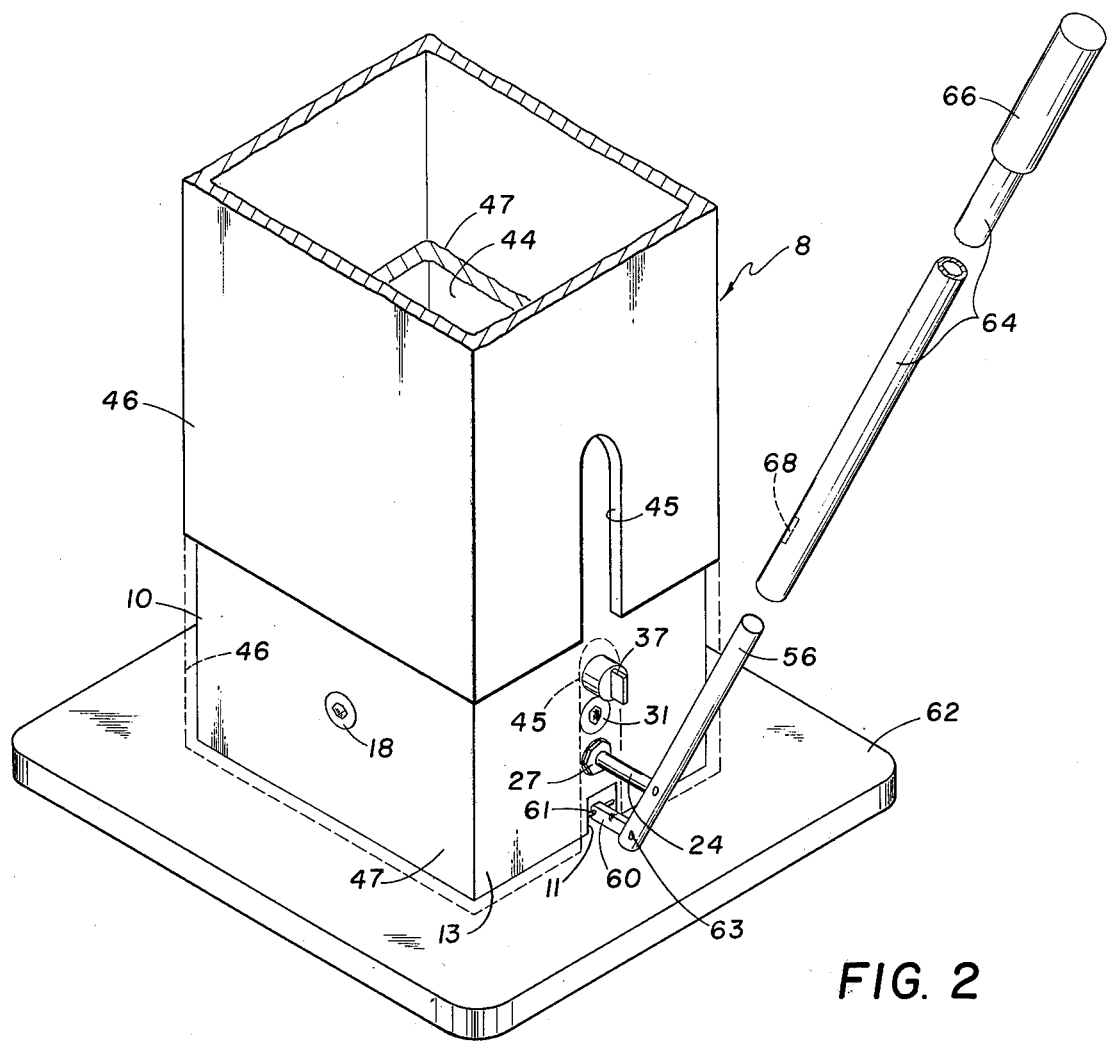
FIG. 2 is a fragmentary perspective view of the valve block portion of the camper jack, the fully retracted position being shown in broken lines.

With reference to FIG. 2, the valve block 10 is mounted upon a base plate 62, plate 62 normally engaging the ground when the leg 47 is extended. The exterior housing 46 has a configuration which complements the exterior configuration of the leg 47. Thus, in the fully retracted condition (shown in broken lines) the valve block 10 is concealed by the housing 46.

The hydraulic fluid control elements, including the needle valve tab 37, piston rod 24 and fulcrum 60 are exposed at the valve block 10 at the base of the leg 47. A cutout or notch 45 is formed in the exterior housing 46 and opens downwardly so as to receive the control elements. The cutout 45 allows the leg 47 to be completely retracted without damaging the exposed control elements.

The fulcrum 60 is pivotally connected at 63 to the lower end of a lever 56. The lever 56 is also intermediately connected to the piston rod 24. Thus, as the lever 56 is reciprocably displaced, piston rod 24 is moved reciprocably to impart pumping action as will be more fully discussed hereinafter.

When the base plate 62 is brought into ground contact, the leg 47 is further extended from the housing 46 by longitudinal movement of the piston rod 24.

Fulcrum 60 is pivotally connected to valve block 10 by a pin 61 cooperating in a recess 11 at the base of valve block 10. Fulcrum 60 is also pivotally connected at 63 to lever 56. Pivot points 61 and 63 at each end of fulcrum 60 permit lateral movement of lever 56 thereby accommodating longitudinal movement of piston rod 24 perpendicular to face 13 of valve block 10.

Figure 3:
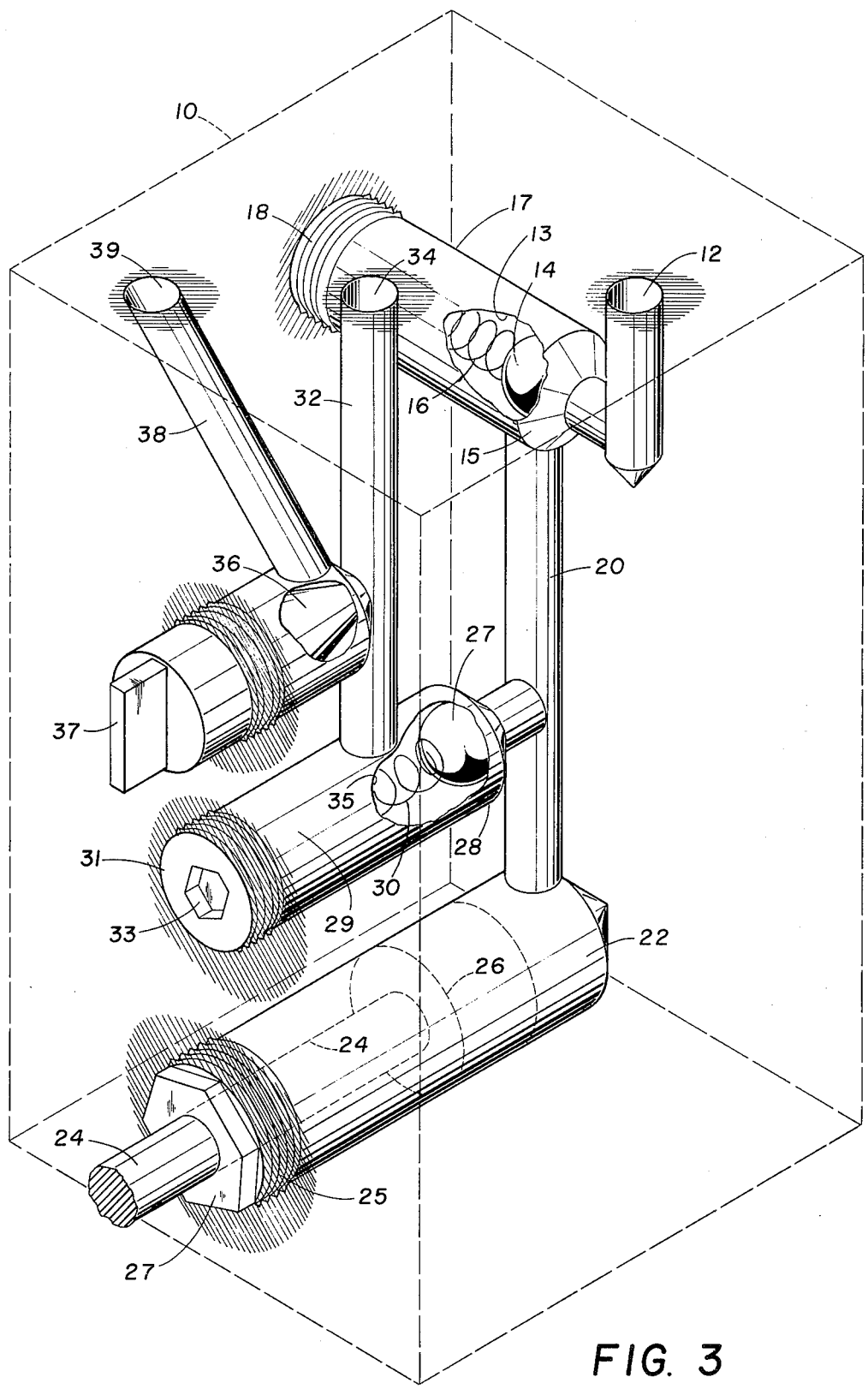
FIG. 3 is a schematic perspective view of the fluid conduits and access ports of the valve block, the valve block being shown in broken lines.

Protrusion of tab 37 beyond the external periphery of housing 46 from the enclosure of cutout 45 permits manual operation of tab 37 to control needle valve 36 (FIG. 3). While the tab 37 is preferably finger-controlled, a slot 68 in handle 64 may be adapted to receive tab 37 when handle 64 is used to rotate tab 37. Handle 64 also is adapted to slip over lever 56 to permit the application of additional leverage at piston rod 24. Jack handle 64 has a hand grip 66 for the comfort and security of the jack operator (not shown).

The extensible leg 47 terminates in a valve block 10, shown best in FIGS. 2 and 3. Referring particularly to FIG. 3, valve block 10 is shown by broken lines whereas the associated hydraulic fluid regulating components contained therein are emphasized.

The apparatus of valve block 10 is more easily understood by reference to the hydraulic circuit shown best in FIG. 3. Hydraulic fluid enters valve block 10, in part, through an inlet port 12 from a fluid reservoir 44 (FIGS. 2 and 4) and passes through a one-way check valve 15. Check valve 15 includes a valve cavity 17 and a ball 14. Ball 14 is held against a ball valve seat (not shown) by the compressive force of spring 16. A threaded plug 18 restrains spring 16 and seals valve cavity 17. Removal of plug 18 permits access to valve cavity 17 and check valve 15 from the external periphery of valve block 10.

After passing through check valve 15, the hydraulic fluid traverses conduit 20 into a pumping piston reservoir 22. A pumping piston 26 operating in the reservoir 22 produces positive and negative pressures in the conduit 20. Negative pressure in reservoir 22 creates the necessary pressure differential across check valve 15 to cause unidirectional fluid flow into conduit 20.

Hydraulic fluid under positive pressure in reservoir 22 and, subsequently conduit 20, is prevented from returning to inlet 12 by check valve 15 and forces check valve 28 open. The hydraulic fluid passes through check valve 28 and conduit 32 to exit port 34. Exit port 34 is the entrance to the jack piston reservoir 50 (FIG. 4) of the jack cylinder 48.

A ball 27 of check valve 28 is held by a spring 30 against a ball valve seat (not shown) in a manner similar to check valve 15.

Accordingly, cyclic operation of piston 26 by action upon piston rod 24 cyclically fills and empties reservoir 22 with the direction of fluid flow through conduits 20 and 32 being unidirectionally controlled by one-way check valves 15 and 28. The foregoing action provides hydraulic fluid under positive pressure at exit port 34.

Piston rod 24 passes through a packing nut 25 and connects a lever 56 (FIG. 2) to piston 26. Packing nut 25 slideably seals the piston rod 24 and is adapted to be received in threaded relationship in the distal end of reservoir 22 to seal the same. A hex nut 27 on the end thereof facilitates removal of packing nut 25.

Access to valve cavity 20 and check valve 28 is obtained through a plug 31. A tool receiving recess 33 in plug 31 permits removal of plug 31 from valve cavity 29 in valve block 10. A similar removal feature (not shown) is also provided in plug 18 for access to spring 16 and ball 14. Plugs 18 and 31, when fully engaged in valve cavities 17 and 29, respectively, are flush with the external surface of valve block 10.

Figure 4:
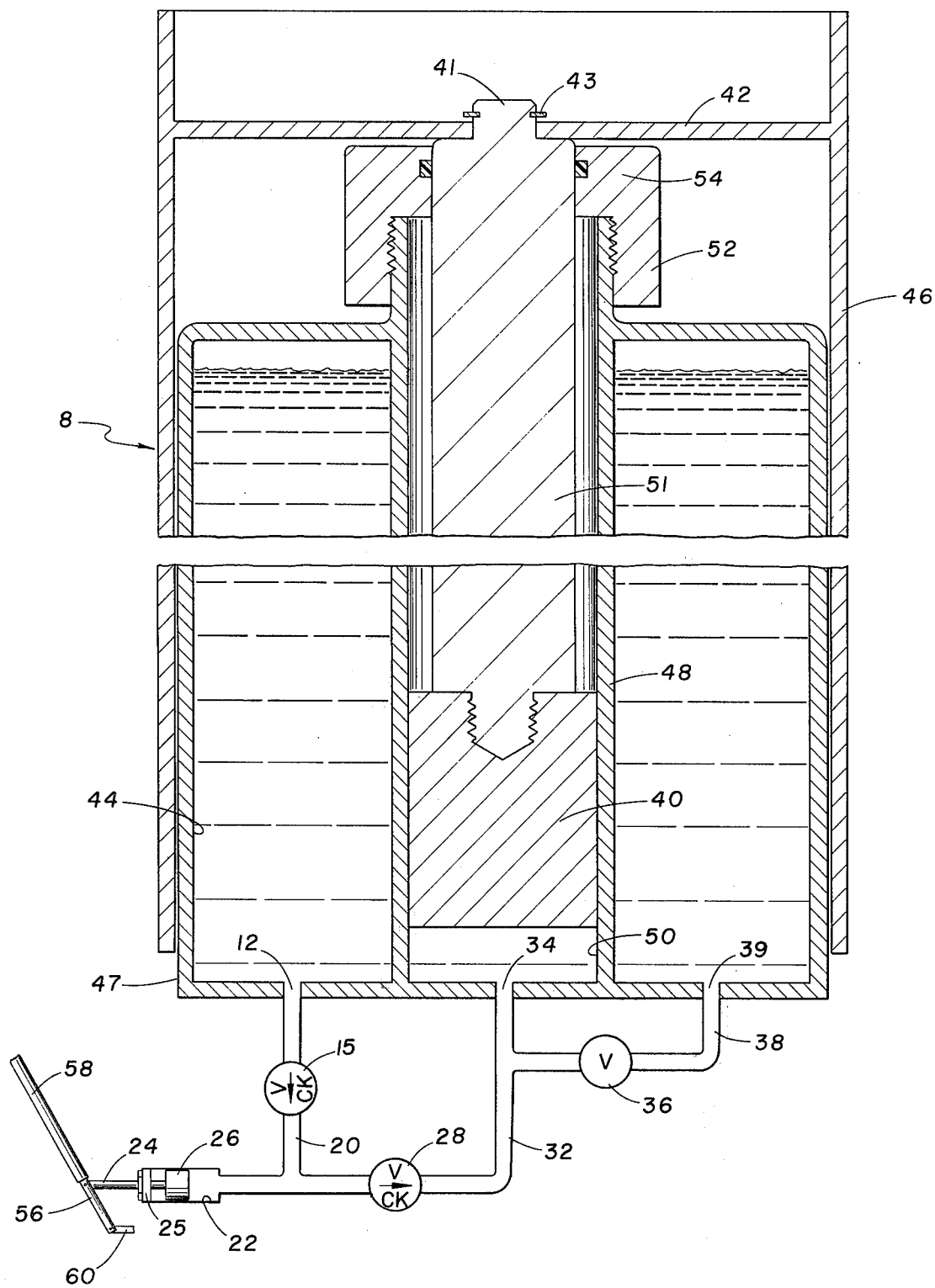
FIG. 4 is a cross-sectional view of the camper jack with the hydraulic fluid conduits being shown schematically.

Reference is now made to FIG. 4. Extensible leg 47 is hollow which hollow forms a hydraulic fluid reservoir 44. Centrally disposed in the reservoir 44 is a cylinder 48 which is in fluid communication with reservoir 44 through the previously described port 34. A jack piston 40 reciprocably disposed within cylinder 48 is attached to one end of a piston rod 51 which is, in turn, connected to a plate 42. Plate 42 is an integral part of the housing 46. Movement of piston 40 is controlled by pressure of hydraulic fluid entering cylinder 48 through port 34.

Packing nut 52 and packing 54 provide a hydraulic seal for piston rod 51. Packing nut 52 prevents inadvertent removal of piston 40 from cylinder 48 and seals the distal end of piston cylinder 48.

A snap ring 43 securely engages a boss 41 on the end of piston rod 51. Removal of snap ring 43 permits withdrawal of the entire extensible leg 47 and associated parts of the leg assembly from the housing 46.

Accordingly, hydraulic fluid reservoir 44 is formed in the peripheral space 44 about cylinder 48 and extends substantially the entire length of cylinder 48. With this particular embodiment it is, therefore, possible to obtain a relatively large capacity hydraulic fluid reservoir to permit extension of piston 40 to substantially the entire length of cylinder 48.

Hydraulic fluid from the piston cylinder 48 is returned to the hydraulic fluid reservoir 44 through conduit 38. A needle valve 36 controls the flow of hydraulic fluid through conduit 38.

To displace piston 40, hydraulic fluid enters the inlet port 12 from reservoir 44 and passes through check valve 15 and conduit 20 into reservoir 22 when negative pressure exists either in piston cylinder 48 or in piston reservoir 22. Positive pressure in piston reservoir 22 forces the hydraulic fluid through check valve 28 into conduit 32 where it passes through exit port 34 into the cylinder 48 to cause longitudinal movement of piston 40 and hence extension of leg 47. Maintaining valve 36 in the closed position prevents the flow of fluid from cylinder 48 and thus maintains the piston 40 and, consequently, housing 46 and extensible leg 47 in the preselected relative position.

By opening valve 36, hydraulic fluid is permitted to escape from cylinder 48 through conduit 38 and port 39 into the fluid reservoir 44. Accordingly, loss of hydraulic fluid from cylinder 48 permits retraction of the extensible leg 47 into housing 46.

With the one-way check valve system of the valve block 10 of the illustrated embodiment of the invention, it is possible to manually extend or retract leg 47 of the jack. During manual extension, hydraulic fluid is drawn through check valves 15 and 28 into the jack cylinder 48 by the negative pressure created in the cylinder 48. Cessation of the negative pressure in cylinder 48 stops the inflow of hydraulic fluid and check valve 28 prevents the flow of hydraulic fluid in the reverse direction.

Closure of valve 36 coupled with the automatic closure of check valve 28 accordingly entraps the hydraulic fluid in cylinder 48 thereby establishing the position of extensible leg 47 relative to housing 46.

Retraction of extensible leg 47 into housing 46 of the jack is accomplished by manually operating valve 36. Conveniently, handle 64 can be used to open valve 36 by inserting tab 37 (FIG. 2) into the slot 68. When the valve 36 is open, hydraulic fluid flows from cylinder 48 into hydraulic fluid reservoir 44 through conduit 38, thus allowing the leg 47 to retract. Accordingly, it is possible for the jack operator to extend, raise, lower, or otherwise operate the jack by use of the jack handle 64 thus reducing bending or otherwise operating from an uncomfortable physical position.

A further unique feature of this invention is that all jack operator initiated force is directed against the jack at or near the ground surface since the pumping apparatus is located at the foot of the extensible leg. This feature is a distinct improvement over those camper jacks which incorporate a pumping piston at an upper end whereby pumping forces are directed against the camper body.

Once attached, extension of extensible leg 47 is readily accomplished merely by releasing a mechanical latch (not shown). The force of gravity coupled, if desired, with manually pulling down on extensible leg 47 will cause fluid from the hydraulic fluid reservoir 44 to flow through check valves 14 and 28 into the cylinder 48. The previously described flow of hydraulic fluid can be accelerated by opening valve 36 whereby fluid will also flow through conduit 38 into jack cylinder 48 from fluid reservoir 44. In this manner, the jack can be extended to its full length or until it touches the ground merely by releasing the aforementioned mechanical latch (not shown). Once extended to contact the ground with base plate 62, extensible leg 47 may be further extended by the earlier described pumping action exerted upon the piston 26. Extensible leg 47 may be retracted into housing 46 by opening needle valve 36 and forcing hydraulic fluid from cylinder 48 into hydraulic fluid reservoir 44 through conduit 38.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An extensible jack comprising:
    a piston hydraulically operable in a cylinder;
    a hydraulic fluid reservoir surrounding the cylinder along a substantial portion of its length;
    a housing connected to the piston;
    a valve block coextensive with the reservoir and at the base of the cylinder, said valve block fitting telescopically within the housing and comprising at least one hydraulic conduit therein in fluid communication between the reservoir and cylinder and having at least one check valve in the conduit, said valve block further comprising means for accessing the check valve through the exterior of the valve block, said accessing means being essentially flush with the exterior surface of the valve block so as to permit substantially all of the valve block to be recessed telescopically into the housing so as to permit the housing to slidably cover the valve block when the piston is fully retracted into the cylinder; and
    hydraulic fluid pumping means for pumping fluid from the reservoir to the cylinder.

2. An extensible jack comprising:
    a piston hydraulically operable in a elongated cylinder;
    a hydraulic fluid reservoir formed by a space between the cylinder and a wall of an extensible leg of the jack;
    a housing connected to the piston;
    a valve block coextensive with the extensible leg and at the base of the cylinder, said valve block fitting telescopically within the housing and comprising first hydraulic fluid communication means having first and second check valves therein for unidirectionally conducting fluid from the reservoir to the cylinder, said first hydraulic fluid communication means further comprising first and second plugs, said plugs being essentially flush with the external surface of the valve block so as to permit the extensible leg and substantially all of the valve block to be recessed telescopically into the housing when the piston is fully retracted, said plugs also having means adapted to receive a tool for removal of the plugs to provide access to the first and second check valves, said valve block further comprising second hydraulic fluid communication means operable between the cylinder and the reservoir having a manually controlled valve interposed therein; and
    hydraulic fluid pumping means in communication with the first fluid communication means and between the first and second check valves.

* * * * *